United States Patent
Hirl

(10) Patent No.: US 8,124,824 B2
(45) Date of Patent: Feb. 28, 2012

(54) SYSTEM AND METHOD FOR USING SUPER CRITICAL STATE CARBON DIOXIDE ($CO_2$) AS A HYDROCARBON DILUENT

(76) Inventor: Michael J. Hirl, Houston, TX (US)

( * ) Notice: Subject to any disclaimer, the term of this patent is extended or adjusted under 35 U.S.C. 154(b) by 396 days.

(21) Appl. No.: 12/386,433

(22) Filed: Apr. 17, 2009

(65) Prior Publication Data

US 2009/0264695 A1 Oct. 22, 2009

Related U.S. Application Data

(60) Provisional application No. 61/124,596, filed on Apr. 17, 2008.

(51) Int. Cl.
*C07C 7/20* (2006.01)
(52) U.S. Cl. .......................... 585/807; 585/833; 585/899
(58) Field of Classification Search .................. None
See application file for complete search history.

(56) References Cited

U.S. PATENT DOCUMENTS

| | | | | |
|---|---|---|---|---|
| 4,529,037 A | * | 7/1985 | Froning et al. | 166/266 |
| 4,683,948 A | * | 8/1987 | Fleming | 166/402 |
| 5,992,354 A | * | 11/1999 | Ahern et al. | 123/25 B |
| 8,021,464 B2 | * | 9/2011 | Gauthier et al. | 95/96 |

* cited by examiner

*Primary Examiner* — Tam M Nguyen
(74) *Attorney, Agent, or Firm* — Strasburger & Price, LLP

(57) ABSTRACT

A system and method for the use of super critical $CO_2$ as a carrying or suspension agent for transport of extracted or processed hydrocarbons. The super critical state $CO_2$ is then co-mingled with the extracted or processed hydrocarbons and transported in the co-mingled state to a delivery point. At the delivery point, the super critical state $CO_2$ is allowed to return to its gaseous state allowing the separation of the hydrocarbons therefrom. The hydrocarbons may be processed and the gaseous $CO_2$ returned to its super critical state for future transport, use in EOR, or geologically sequestered.

17 Claims, 1 Drawing Sheet

Figure 1:
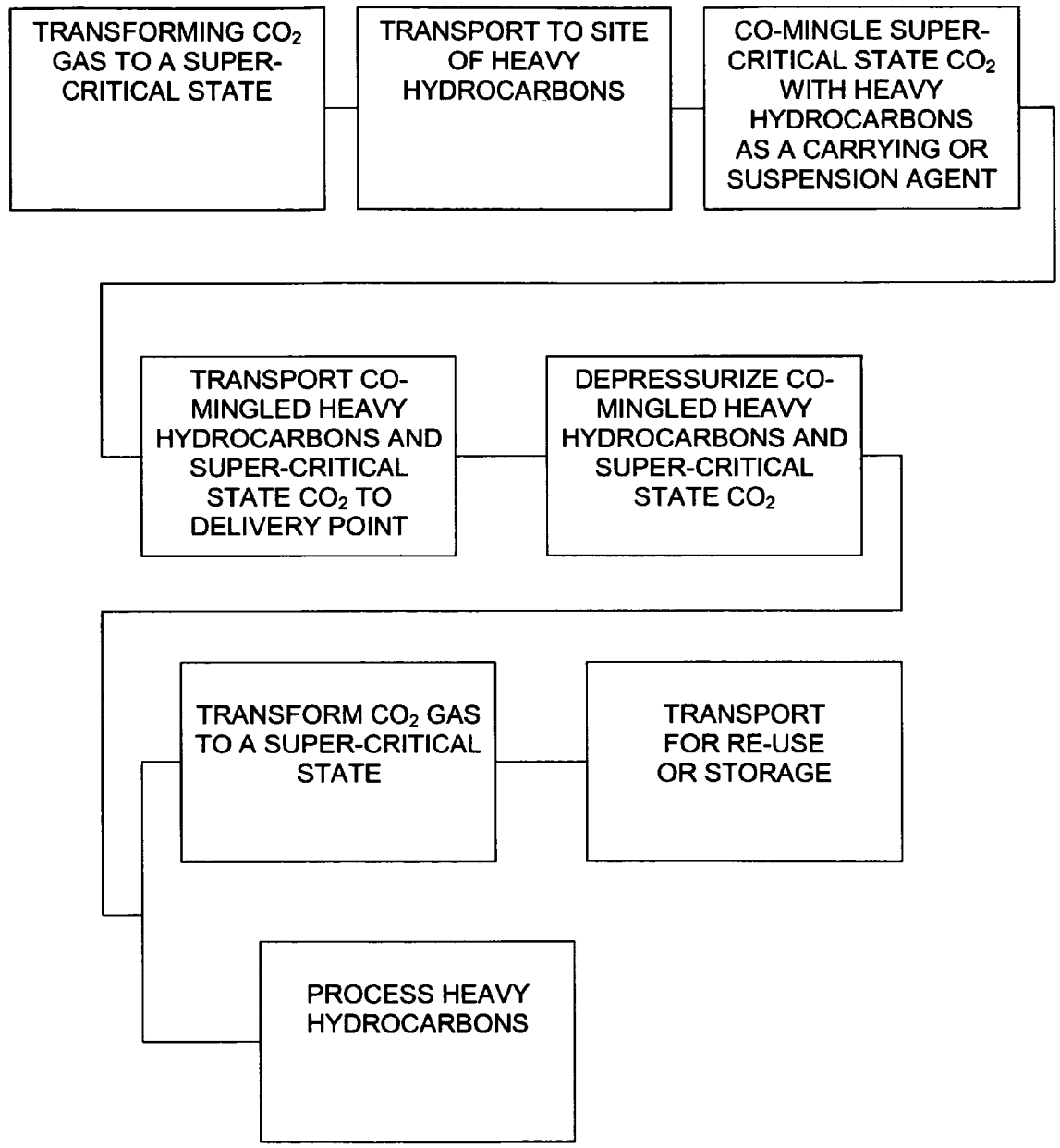

SYSTEM AND METHOD FOR USING SUPER CRITICAL STATE CARBON DIOXIDE ($CO_2$) AS A HYDROCARBON DILUENT

CROSS REFERENCE TO RELATED APPLICATION

This application claims the benefit of Provisional U.S. Patent Application No. 61/124,596 filed Apr. 17, 2008.

STATEMENT REGARDING FEDERALLY FUNDED RESEARCH AND DEVELOPMENT

The invention described in this patent application was not the subject of federally sponsored research or development.

FIELD

The system and method of the present invention pertains to the recovery and transport of extracted or processed hydrocarbons; more particularly, the system and method of the present invention pertains to the use of super critical state $CO_2$ in the recovery and transport of extracted or processed hydrocarbons.

BACKGROUND

Extracted or processed hydrocarbons, for example, heavy hydrocarbons, especially like bitumen or those heavy hydrocarbons mined or produced from "oil sands," require an additional element to be combined with the heavy hydrocarbon, to enable the heavy hydrocarbon to be transported via pipeline. This additional element or additive, more commonly called a "diluent," is injected into and/or otherwise combined with the heavy hydrocarbon, to form a combination known in the industry as a "dilbit."

The use of the diluents is necessary to transport heavy hydrocarbons to upgraders and other processing facilities to make usable products. However, the very high cost of diluents, as represented by the direct investment to acquire diluents and then process these diluents, as well as the opportunity cost of not marketing the diluents for sale in their own markets, directly impacts the recovery and transportation cost associated with producing heavy hydrocarbons, extracted from oil sands as well as making useful products from the heavy hydrocarbons.

Diluents currently in use in the transport of heavy hydrocarbons, include various lighted hydrocarbons such as condensate. With the growth in the production of heavy hydrocarbons from oil sands expected to both continue and grow, the demand for condensate (a high value, very light hydrocarbon product) will exceed available supply. As a result of the anticipated shortage or lack of availability of condensate, other diluents must be considered for use in the dilbit to make up for the anticipated shortfall in the supply of available condensate. Principal among the other diluents being considered are natural gas liquids or as they are more commonly called in the industry, "NGLs." NGLs, like condensate, are very valuable light end hydrocarbons which have their own value and are marketed, traded and transported in their own markets.

Accordingly, there remains a need in the art for a low cost, easily accessible diluent to be used in the transport of heavy hydrocarbons such as those heavy hydrocarbons produced from oil sands.

SUMMARY

The system and method of the present invention provides a low cost, easily accessible product which can be used in the transport of extracted or processed hydrocarbons such as those heavy hydrocarbons produced from oil sands.

According to the system and method of the present invention, $CO_2$ is compressed and transformed into a super critical state. Once in a super critical state, the $CO_2$ is added to a heavy hydrocarbon. The combination of the super critical state $CO_2$ facilitates the removal of the heavy hydrocarbon from a ground formation, such as oil sands.

Once the heavy hydrocarbon is removed from the ground formation, such as oil sands, the combination of the heavy hydrocarbon, with the super critical state $CO_2$ may be transported in a pressurized pipeline or tank to a predetermined delivery destination. Specifically, the super critical state $CO_2$ acts as a carrying or suspension agent for the heavy hydrocarbon.

At the predetermined delivery destination, the pressurized pipeline or tank containing the combination of the super critical state $CO_2$ and the heavy hydrocarbon is de-pressurized. Such de-pressurization of the pressurized pipeline causes the combination of the heavy hydrocarbon, and the $CO_2$ to return to a dual gas-liquid state. The gaseous $CO_2$, is then separated from the heavy hydrocarbon. The heavy hydrocarbon may then be transformed into useful products. The $CO_2$ may then be caused to re-enter a super critical state for re-use or storage.

BRIEF DESCRIPTION OF THE DRAWING FIGURE

A still better understanding of the system and method of the present invention may be had by reference to the drawing FIGURE wherein:

FIG. 1 is a flow diagram of the system and method of the present invention.

DESCRIPTION OF THE EMBODIMENTS

Technical and Historical Background

Carbon dioxide, or as hereinafter referred to as $CO_2$, is a unique molecule. $CO_2$ is found in many common applications such as: an additive for soft drinks to add the "fizz"; dry ice for keeping food cold; and a component in chemical processes, for example, the urea process for making fertilizer. $CO_2$ is also importantly used, in a specialty sense, in the oil and gas industry as an injectant for tertiary oil recovery for what is called in the industry, $CO_2$-EOR (enhanced oil recovery).

The unique application of $CO_2$ in the oil and gas industry began in the early 1970's. Part of this key development was the construction of an expansive and unique infrastructure for handling $CO_2$ at locations where naturally occurring $CO_2$ was discovered. These "naturally sourced" $CO_2$ reservoirs were predominantly at four formations or "domes" discovered in the Untied States. These four formations or domes are: McElmo Dome (SW Colorado), Sheep Mountain (SE Colorado), Bravo Dome (Eastern New Mexico), and Jackson Dome (near Jackson, Miss.). $CO_2$ from these four formations or domes served as the first source from which major $CO_2$ transport pipelines infrastructures were built. These $CO_2$ transport pipelines connect natural $CO_2$ sources to major oil fields at which $CO_2$-EOR is conducted.

Over time, additional anthropogenic sources such as $CO_2$ sources from man-made processes based on the separation of $CH_4$ or methane from $CO_2$, also became more widely available. This increase in availability of $CO_2$ from anthropogenic sources resulted in both anthropogenic and naturally sourced $CO_2$ becoming available for use in $CO_2$ EOR. The designation of $CO_2$ from these two sources is denoted by suffix "a" or "n". $CO_2a$ designates $CO_2$ from an anthropogenic source and $CO_2n$ designates $CO_2$ from a natural source. This nomenclature will be applied herein in all references to $CO_2$.

It is important to note, that what is referred to as either $CO_2a$ or $CO_2n$ is not usually pure $CO_2$; that is $CO_2$ without other gases or elemental components. Rather, $CO_2X$ is the term to describe a somewhat "mixed" gas, or $CO_2$ containing small amounts of nitrogen, oxygen, hydrogen, sulfide and other gases. Some $CO_2n$ sources are 99% or greater pure $CO_2$. Some $CO_2a$ sources contain varying amounts of $H_2S$ gas.

In all cases herein, the terms $CO_2a$ or $CO_2n$ will be used to primarily indicate the distinction in source from which they are obtained. In all cases, both $CO_2$ and $CO_2n$ indicate a $CO_2$ gas or gas mix with varying constituent component gases such as $O_2$, $N_2$, $H_2S$ and other gases as the case may be. The $CO_2$ used as a diluent can either be 100% pure $CO_2$ or be a $CO_2$ gas mix consisting of the various gas components present as a result of the process through which the $CO_2$ is extracted or otherwise captured.

A unique feature of the evolved $CO_2$-EOR industry is the manner in which $CO_2$ is transported. Unlike natural gas (methane) or hydrogen gas which are transported in a gaseous state, all $CO_2$, be it in its relatively pure and/or in its mixed gas state, is transported differently. Specifically, the $CO_2a/CO_2n$ gas and/or mixed gas is first dehydrated to achieve a dryer gas with little or no water or water vapor content. This dehydration process effectively lessens the chances of the $CO_2X$ forming carbonic acid. Such dehydration is important because carbonic acid causes corrosion to form in the pipe or tank transporting the $CO_2X$ gas. Second, and most significantly, $CO_2$ is typically compressed to a pressure at which it takes on a "super critical" state for transport.

Super critical state $CO_2$" is the term used to describe $CO_2$ that is in a fluid state while also being at or above both its critical temperature and pressure. In its super critical state, $CO_2$ exhibits some uncommon properties. Specifically, $CO_2$ usually behaves as a gas in air at STP or as a solid called "dry ice" when the $CO_2$ gas is frozen. If the temperature and pressure are both increased from STP to be at or above the critical point for $CO_2$, $CO_2$ can adopt properties some where between a gas and a liquid. More specifically, super critical $CO_2$ behaves as a super critical fluid above its critical temperature (31.1° C.) and critical pressure (73 atm), expanding to fill its container like a gas but with a density like that of a liquid.

Consequently, $CO_2$ (both a and n) is different from gases from a transport and infrastructure perspective. Specifically, $CO_2$ (a and n) in the pure or mixed gas state needs to be caused to enter a super critical state. More particularly a means for causing $CO_2$ to enter a super critical state such as a compressor is used to cause the $CO_2$ to achieve a "super critical" state. In the super critical state, $CO_2$ behaves like a liquid. And, like most liquids, super critical state $CO_2$ can be passed through a series of pumps where the pressure of the super critical state $CO_2$ can be increased at each pump. However, the $CO_2$ gas must first be compressed or otherwise cooled to reach a super critical state. New process technologies are providing methods by which the amount of compression required for $CO_2$ to reach its super critical state is minimized through cryogenic processing. In cryogenic processing, a $CO_2$ gas/mix is passed through cryogenic units whereupon the density of the $CO_2$ gas/mix increases and less compression of the $CO_2$ gas is subsequently required. It is important to note that reaching the "super critical state" is the key transport attribute.

Once $CO_2$ in its super critical state, the $CO_2$ gas/mix is usually run through pumps to increase its pressure up to 2000 psi, and in some cases higher pressures, depending on the pressure rating of the transport pipe or tank. Pumps for the $CO_2$ gas/mix are generally inexpensive to operate. Therefore, the movement of super critical $CO_2$ has comparatively lower overall transportation costs than $CO_2$ gas while still enabling transport and delivery to an injection point—especially for $CO_2$EOR use and geologic sequestration at a much higher pressure. It is this key characteristic of $CO_2a$ and $CO_2n$ upon which the system and method of the present invention is predicated. Once in its super critical state, the $CO_2$ may be moved in a means for transport such as a pipeline or in tanks on a transport vehicle to the location of the heavy hydrocarbon. Heretofore, this important transportation characteristic of $CO_2$ in a super critical state has not been used with a heavy hydrocarbon, such as bitumen.

Disclosed System and Method

According to the system and method of the present invention, $CO_2$ from any source (either anthropogenic or natural), in either pure or mixed gas form, is compressed or otherwise taken to a super critical state. The super critical state $CO_2$ is then used as a carrying or suspension agent for the transport of bitumen and/or other heavy hydrocarbons via a pipeline or other transportation means (even including petcoke where $CO_2$ could serve as a carrying or suspension agent or what is more commonly referred to for petcoke to be a "slurry" mix). The super critical state $CO_2$ is added to the very heavy hydrocarbons, in either of the following combinations:

100% $CO_2$—pure "carbonbit"; or a predetermined mixture consisting of some percentage of either condensate, NGLs, or other very light hydrocarbon or non-hydrocarbon fluids—wherein the super critical state $CO_2$ constitutes a minimum of 5% or greater of the total added carrying or suspension agent—either by volume or by weight.

Specific processing techniques will vary depending on site, operation, and existing process facilities as to how the super critical state $CO_2$ and heavy hydrocarbon, such as bitumen, and possibly other chemical products are commingled and injected as a combination into the pipeline for transport. Such means for co-mingling the super critical state $CO_2$ and the heavy hydrocarbons are well known to those of ordinary skills in the art.

Regardless of the specific engineered process, the energy savings along with the market and economic efficiencies will be significant. By using super critical state $CO_2$ as a carrying or suspension agent in the dilbit (e.g. "carbit" with $CO_2$ or carbon) or even as partial replacement by volume of current diluents, an inexpensive technique/process will exist by which $CO_2a/CO_2n$ may be transported for $CO_2$ EOR and/or geologic sequestration in approved aquifers and formations.

The newly constituted dilbit including $CO_2a$ or $CO_2n$ and a heavy hydrocarbon is then moved through a means for transport such as a pipeline or in tanks on a transport vehicle to a final delivery destination. Upon receipt at the final delivery destination, the pipe containing the combination of super critical state $CO_2$ and the heavy hydrocarbon will be depressurized so that the combined super critical state $CO_2$ and heavy hydrocarbon would return to a dual gas-liquid phase. At that point, the $CO_2$ would be separating from the heavy hydrocarbon. The heavy hydrocarbon would drop out of formation and be processed at the processing destination or upgrader. The separated $CO_2$, while in a gaseous phase, would be handled to maintain as high a pressure rating as possible. Maintaining a high pressure rating enables inexpensive re-compression and/or pumping of the $CO_2$ back to a super critical state wherein the super critical state $CO_2$ would be transported via a pipeline or tank to oil and/or gas fields for EOR/EGR, coal fields for enhanced coal bed methane, or saline reservoirs/dormant oil/gas fields or other geological formations where the $CO_2$ can be permanently sequestered and/or stored.

The complete process would then result in a full carbon cycle from (i) initial production/mining or processing of the heavy hydrocarbon in the extraction phase to; (ii) pre-transport processing phase, to (iii) a final storage or sequestration phase.

While the system and method of the disclosed invention has been disclosed according to its preferred and alternate embodiments, those of ordinary skill in the art will understand that modifications may be made to the disclosed invention without departing form the system and method of the present invention. Such modifications shall be included within the scope and meaning of the appended claims.

What is claimed is:

1. A method for utilizing super critical state $CO_2$ as a carrying or suspension agent for extracted or processed hydrocarbons, said method comprising the steps of:
    causing $CO_2$ to enter a super critical state;
    transporting said super critical state $CO_2$ to the processed hydrocarbons;
    commingling the super critical state $CO_2$ with the processed hydrocarbons;
    transporting the super critical state $CO_2$ together with the processed hydrocarbons to a predetermined delivery destination.

2. The method as defined in claim 1 further including the step of:
    depressurizing the mixture of super critical state $CO_2$ and processed hydrocarbons at the delivery destination;
    recovering the gaseous phase $CO_2$;
    causing the gaseous phase $CO_2$ to re-enter a super critical state;
    transporting the super critical state $CO_2$ to one or more locations including but not limited to: EOR/EGR, coal fields for enhanced coal bed methane, and a sequestration location.

3. The method of claim 1, wherein the hydrocarbons are bitumen.

4. The method of claim 1, wherein a pipeline is used in the step of transporting the super critical state $CO_2$ together with the processed hydrocarbons.

5. The method of claim 3, wherein a pipeline is used in the step of transporting the super critical state $CO_2$ together with the processed hydrocarbons.

6. The method of claim 1, wherein a truck is used in the step of transporting the super critical state $CO_2$ together with the processed hydrocarbons.

7. The method of claim 3, wherein a truck is used in the step of transporting the super critical state $CO_2$ together with the processed hydrocarbons.

8. A method for utilizing super critical state $CO_2$ to transport extracted or processed hydrocarbons, said method comprising the steps of:
    transporting a super critical state $CO_2$ to the processed hydrocarbons;
    commingling the super critical state $CO_2$ with the processed hydrocarbons; and
    transporting the super critical state $CO_2$ together with the processed hydrocarbons to a predetermined delivery destination.

9. The method of claim 8, wherein the hydrocarbons are bitumen.

10. The method of claim 8, wherein a pipeline is used in the step of transporting the super critical state $CO_2$ together with the processed hydrocarbons.

11. The method of claim 9, wherein a pipeline is used in the step of transporting the super critical state $CO_2$ together with the bitumen.

12. The method of claim 8, wherein a truck is used in the step of transporting the super critical state $CO_2$ together with the processed hydrocarbons.

13. The method of claim 9, wherein a truck is used in the step of transporting the super critical state $CO_2$ together with the processed hydrocarbons.

14. A method for utilizing super critical state $CO_2$ as a carrying or suspension agent for extracted or processed hydrocarbons, said method comprising the steps of:
    commingling the super critical state $CO_2$ with the processed hydrocarbons in a pipeline;
    transporting said super critical state $CO_2$ to the processed hydrocarbons; and
    transporting the super critical state $CO_2$ together with the processed hydrocarbons to a predetermined delivery destination.

15. The method of claim 14 wherein the hydrocarbons are bitumen.

16. The method of claim 14, wherein a truck is used in the step of transporting the super critical state $CO_2$ together with the processed hydrocarbons.

17. The method of claim 15, wherein a truck is used in the step of transporting the super critical state $CO_2$ together with the bitumen.

* * * * *